(12) United States Patent
Ishii

(10) Patent No.: US 7,066,294 B2
(45) Date of Patent: Jun. 27, 2006

(54) HYDRAULICALLY DRIVEN AND STEERED VEHICLE

(76) Inventor: Norihiro Ishii, 2-18-1, Inadera, Amagasaki-shi, Hyogo (JP)

( * ) Notice: Subject to any disclaimer, the term of this patent is extended or adjusted under 35 U.S.C. 154(b) by 222 days.

(21) Appl. No.: 10/835,602

(22) Filed: Apr. 30, 2004

(65) Prior Publication Data

US 2004/0231907 A1 Nov. 25, 2004

(30) Foreign Application Priority Data

May 2, 2003 (JP) ............................. 2003-127341

(51) Int. Cl.
*B60K 17/00* (2006.01)
(52) U.S. Cl. ........................... 180/305; 180/6.2
(58) Field of Classification Search ...................... None
See application file for complete search history.

(56) References Cited

U.S. PATENT DOCUMENTS

| | | | | |
|---|---|---|---|---|
| 3,552,516 | A | * | 1/1971 | Beard et al. ................. 180/243 |
| 5,137,100 | A | * | 8/1992 | Scott et al. ................. 180/6.48 |
| 6,189,641 | B1 | * | 2/2001 | Azuma ......................... 180/242 |
| 6,196,342 | B1 | * | 3/2001 | Teal et al. .................... 180/6.2 |
| 6,196,348 | B1 | * | 3/2001 | Yano et al. .................. 180/242 |
| 6,257,357 | B1 | | 7/2001 | Teal et al. |
| 6,662,895 | B1 | * | 12/2003 | Bednar ......................... 180/308 |
| 6,681,570 | B1 | * | 1/2004 | Takada et al. ................. 60/468 |
| 6,921,109 | B1 | * | 7/2005 | Hutchison et al. ........... 280/771 |
| 2003/0201134 | A1 | | 10/2003 | Ishii et al. |

FOREIGN PATENT DOCUMENTS

| | | |
|---|---|---|
| JP | 2000-25637 | 1/2000 |
| JP | 3176237 | 4/2001 |
| JP | 2003-312528 | 11/2003 |

* cited by examiner

*Primary Examiner*—J. Allen Shriver
*Assistant Examiner*—Christopher Bottorff
(74) *Attorney, Agent, or Firm*—Sterne, Kessler, Goldstein & Fox P.L.L.C.

(57) ABSTRACT

A hydraulically driven and steered vehicle comprises a pair of axles differentially connected to each other, a traveling HST, a steering HST, a speed control operation device operative connected to a movable swash plate of the traveling HST, and a steering operation device operatively connected to a movable swash plate of the steering HST. A speed control linkage is interposed between the steering operation device and the swash plate of the steering HST. A hydraulic actuator and a hydraulic valve are connected to the steering control linkage so as to reverse the relative movement direction of the swash plate of the steering HST to the movement direction of the steering operation device depending upon the reversing of forward and backward traveling direction.

8 Claims, 11 Drawing Sheets

HYDRAULICALLY DRIVEN AND STEERED VEHICLE

BACKGROUND OF THE INVENTION

1. Field of the Invention

The present invention relates to a vehicle having two hydrostatic stepless transmissions (HSTs); one is a traveling HST for driving the vehicle either forward or backward at various speeds, and the other is a steering HST for turning the vehicle rightward or leftward at various relative speeds of right and left drive wheels.

2. Related Art

As well known from U.S. Pat. No. 6,257,357, there is a conventional hydraulically driven and steered vehicle having two HSTs, i.e., the traveling HST and the steering HST. The traveling HST is provided for driving left and right drive wheels forward or backward at the same various speed, and the steering HST is provided for differentially driving the left and right drive wheels so as to turn the vehicle leftward or rightward. To change the rotational speed and direction of respective hydraulic motors of the HSTs, the vehicle is provided with a speed control operation device, such as an accelerator pedal, operatively connected to the traveling HST, and with a steering operation device, such as a steering wheel, operatively connected to the steering HST.

In the hydraulically controlled vehicle having the traveling HST and steering HST, the most complex and important point for constructing a linkage between the two HSTs is to ensure a reverse steering logic mechanism, i.e., to make the right and left turning direction coincide with the rotational direction of the steering wheel whether the vehicle travels forward or backward. The disclosed conventional vehicle is provided with a purely mechanical reverse steering logic mechanism with no assist of a hydraulic mechanism, which is complicated in assembly. Further, while the HSTs are disposed between the rear axles, the steering control linkage (i.e., the reverse steering logic mechanism, including the sector gear meshing with the pinion on the bottom end of the steering wheel shaft), is extended in front of the bottom end of the steering wheel shaft so as to be connected to the accelerator pedal, thereby making a large dead space between the bottom end of the steering wheel shaft and the HSTs therebehind in the fore-and-aft direction, and thereby prevents reduction of the vehicle.

There is another conventional reverse logic mechanism, which is not provided in the steering control linkage but in the steering HST, as disclosed in JP 2003-312528A and US 2003/0201134A1. This is constituted by a directive control valve disposed across the pair of oil passages between the pump and motor of the steering HST so as to exchange the ports of motor to be connected to the suction and delivery ports of pump depending upon whether the vehicle travels forward or backward. When the vehicle travels forward and the steering wheel is turned from its straight traveling position, one oil passage is hydraulically pressured higher than the other. The turning vehicle sometimes requires its traveling direction to be reversed between forward and backward. However, even if the angle of the steering wheel is kept, the exchange of port-connection between the pump and motor in the steering HST by the reverse of traveling direction causes that the depressed oil passage suddenly becomes higher-pressured. Such fluctuation of oil flow and pressure in the closed oil circuit of the steering HST causes an operator to feel discomfort.

SUMMARY OF THE INVENTION

A first object of the present invention is to provide a hydraulically driven and steered vehicle, comprising: a pair of axles differentially connected to each other; a prime mover; a speed control operation device for controlling the traveling speed of the vehicle and switching the traveling direction of the vehicle between forward and backward; a traveling HST including a variable displacement hydraulic traveling pump drivingly connected to the prime mover, the traveling pump having a movable swash plate operatively connected to the speed control operation device, and a hydraulic traveling motor fluidly connected to the traveling pump and drivingly connected to the axles so as to drive the axles at the same various speed in the same forward or backward direction; a steering operation device for turning the vehicle; a steering HST including a variable displacement hydraulic steering pump drivingly connected to the prime mover, the steering pump having a movable swash plate, and a hydraulic steering motor fluidly connected to the steering pump and drivingly connected to the axles so as to drive the axles differentially; and a steering control linkage operatively interposed between the steering operation device and the swash plate of the steering pump, wherein the steering control linkage is compactly provided with a reverse steering logic mechanism.

To achieve the first object, in the hydraulically driven and steered vehicle according to the present invention, the steering control linkage includes a hydraulic actuator constituting a reverse steering logic mechanism. The hydraulic actuator is switched between a forward traveling state and a backward traveling state. The relation of movement direction of the swash plate of the steering pump to movement direction of the steering operation device is reversed according to switching of the hydraulic actuator between the forward traveling state and the backward traveling state. The steering control linkage further includes a hydraulic valve for supplying fluid to the hydraulic actuator. The hydraulic valve is controlled so as to set the hydraulic actuator to either the forward traveling state or backward traveling state depending upon whether the speed control operation device is operated for forward traveling or backward traveling.

Due to the hydraulic actuator and valve, the mechanical portion of the steering control linkage provided with the reverse steering logic mechanism is minimized and simplified.

Preferably, the hydraulic actuator can be switched to a neutral state for setting the swash plate of the steering pump to its neutral position, and the hydraulic valve can be controlled so as to set the hydraulic actuator to the neutral state by setting the speed control operation device in a neutral position.

Accordingly, when the speed control operation device is set in the neutral position, the swash plate of the steering pump is kept in the neutral position, thereby preventing the stationary vehicle from unexpectedly spinning caused by miss-operating the steering operation device.

Preferably, the steering operation device is a steering wheel having a rotational axis with a bottom end pinion. The steering control linkage comprises a sector gear meshing with the pinion, and a link member interposed between the sector gear and the swash plate of the steering pump. The sector gear has opposite first and second ends between a gear edge thereof and a pivot end thereof. The link member is connected to a first portion of the sector gear toward the first end by setting the hydraulic actuator to the forward traveling state, and connected to a second portion of the sector gear toward the second end by setting the hydraulic actuator to the backward traveling state.

By switching the hydraulic actuator between the forward traveling state and the backward traveling state, the portion of the sector gear connected to the link member between the first and second portions so as to reverse the relation of the rotational direction of the sector gear to the movement direction of the link member, thereby establishing a simple reverse steering logic mechanism.

Preferably, the steering control linkage is provided with a mechanism for returning the steering operation device and the swash plate of the steering pump to respective neutral positions. If the steering control linkage is provided with the above sector gear and link member, the link member is connected to a middle portion of the sector gear between the first and second ends by setting the hydraulic actuator to the neutral state.

Accordingly, the steering operation device and the swash plate of the steering HST do not require respective neutral-returning means, thereby being compacted and saving costs.

Preferably, the sector gear is extended toward the steering HST from the pinion.

Accordingly, the steering control linkage can be disposed so as to fill a space between the bottom end pinion of the steering wheel and the steering HST shaft, and the space opposite to the steering HST with respect to the pinion is expanded for arranging various members.

A second object of the present invention is to provide a hydraulically driven and steered vehicle comprising: a pair of axles differentially connected to each other; a prime mover; a speed control operation device for controlling the traveling speed of the vehicle and switching the traveling direction of the vehicle between forward and backward; a traveling HST including a variable displacement hydraulic traveling pump drivingly connected to the prime mover, the traveling pump having a movable swash plate operatively connected to the speed control operation device, a hydraulic traveling motor drivingly connected to the axles so as to drive the axles at the same various speed in the same forward or backward direction, and a closed fluid circuit fluidly connecting the traveling pump and the traveling motor; a steering operation device for turning the vehicle; and a steering HST including a variable displacement hydraulic steering pump drivingly connected to the prime mover, the steering pump having a movable swash plate operatively connected to the steering operation device, a hydraulic steering motor drivingly connected to the axles so as to drive the axles differentially, and a closed fluid circuit fluidly connecting the steering pump and the steering motor, wherein sudden change of fluid flow in the steering HST is prevented when the speed change operation device is switched for reversing the traveling direction of the vehicle when turning.

To achieve the second object, in the hydraulically driven and steered vehicle according to the present invention, the steering HST includes a directive control valve disposed in the closed fluid circuit of the steering HST so as to be switched by operation of the speed control operation device for reversing the traveling direction. The steering HST further includes a flow control valve or a pressure control valve disposed in the closed fluid circuit of the steering HST so as to restrict the amount or pressure of fluid flowing therethrough when the directive control valve is switched.

Such valves in the closed fluid circuit of the steering HST restrict fluctuation of oil flow or pressure when reversing the traveling direction of the turning vehicle, thereby ensuring the comfort of the vehicle in such a case.

These, further and other objects, features and advantages will appear more fully from the following description with reference to the accompanying drawings.

BRIEF DESCRIPTION OF THE DRAWINGS/FIGURES

DETAILED DESCRIPTION OF THE INVENTION

Figure 1:
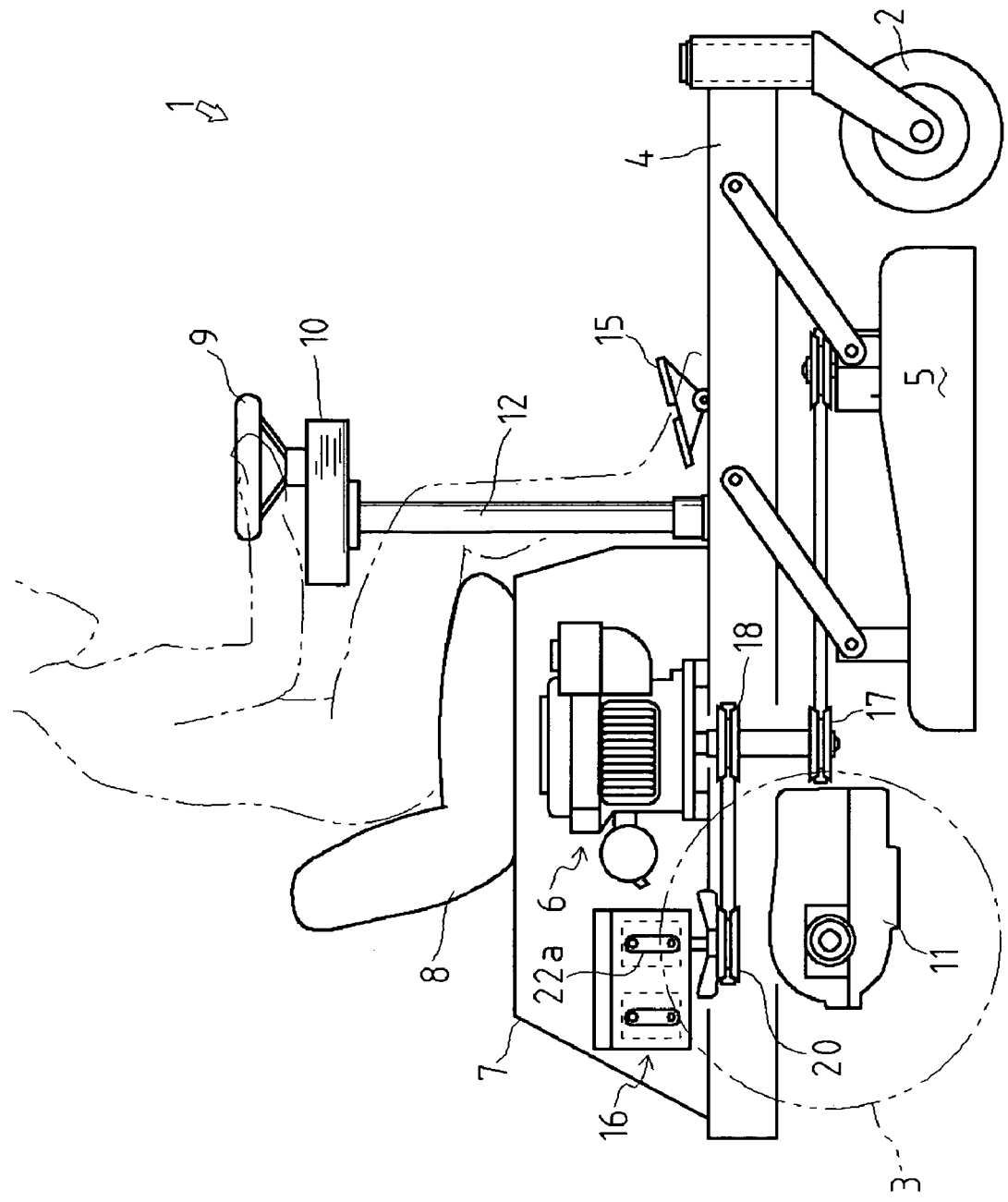
FIG. 1 is a side view of a riding lawn mower as an example of a hydraulically driven and steered vehicle according to the present invention.
Figure 2:
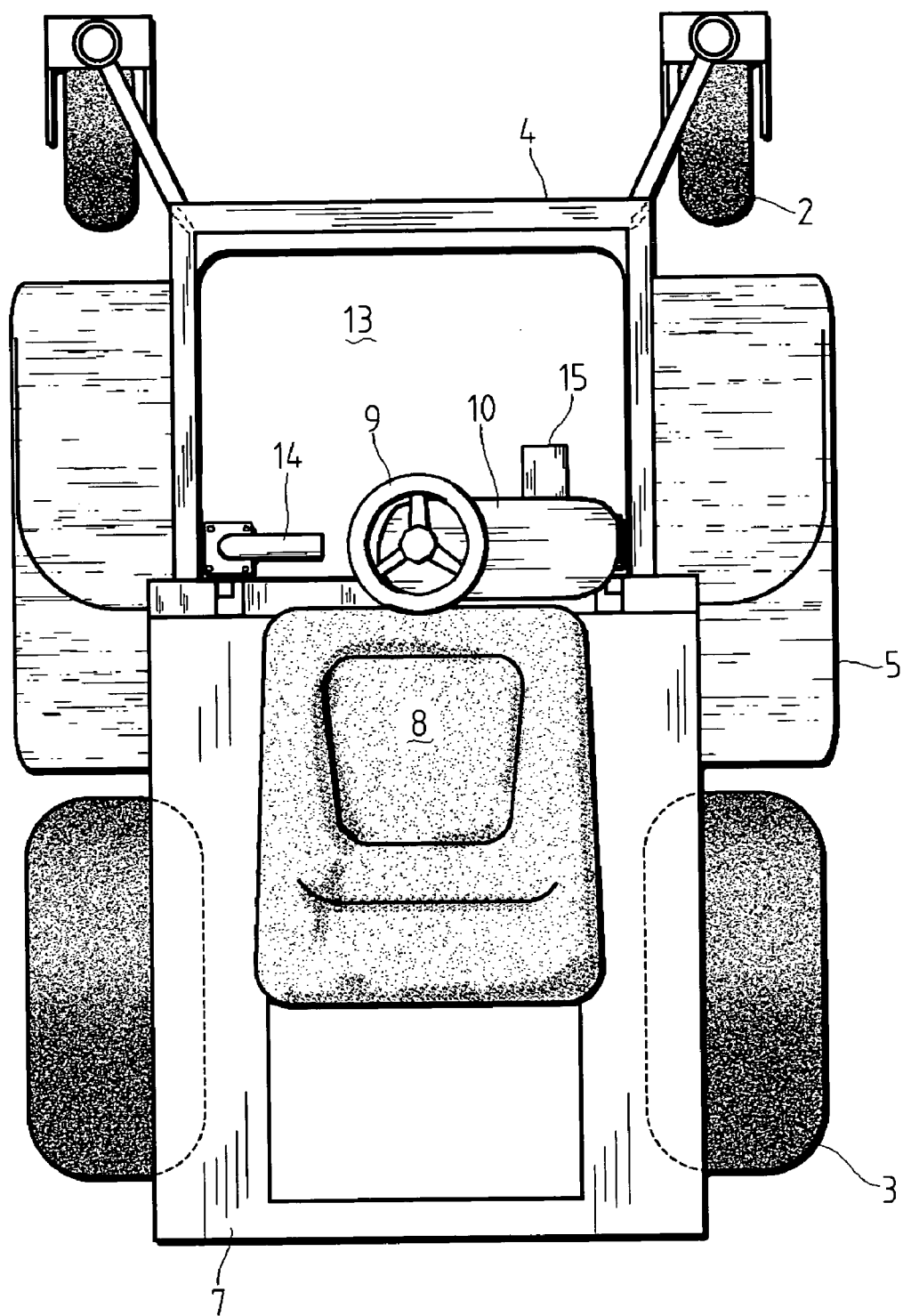
FIG. 2 is a plan view of the vehicle.
Figure 3:
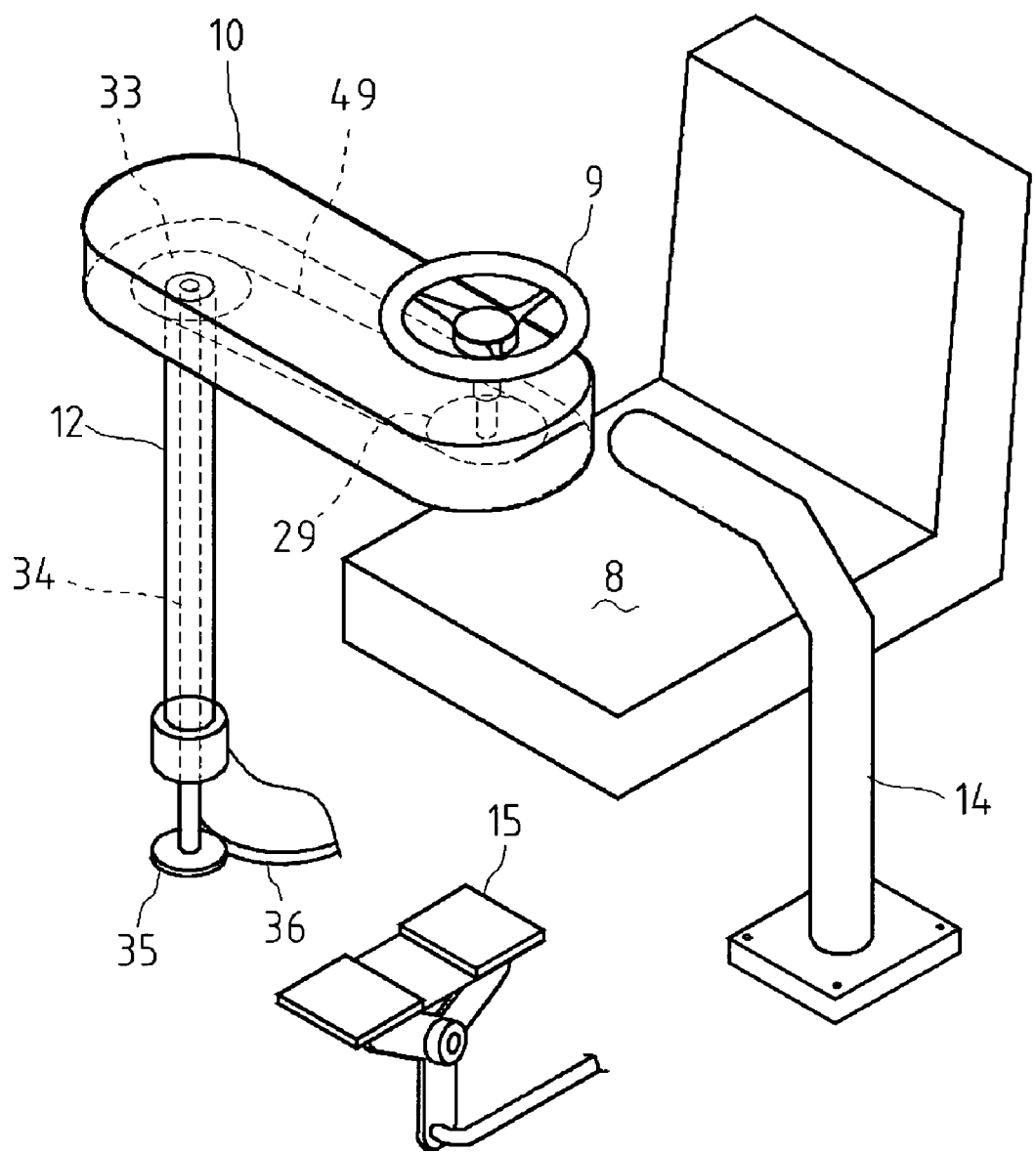
FIG. 3 is a perspective view of an operation section of the vehicle.

Referring to FIGS. 1 to 3, a rear engine lawn tractor serving as a vehicle 1 according to an embodiment of the present invention will be described. Vehicle 1 has right and left front casters 2 and right and left rear drive wheels 3. Vehicle 1 is provided with a frame 4 supporting a vertically movable mower deck 5 therebelow between casters 2 and drive wheels 3. Mower deck 5 has rotary blades for mowing.

An engine 6 and a pump unit 16 behind engine 6 are mounted on a rear portion of frame 4 and covered by an engine cover 7. Engine 6 has a vertically downward output shaft, on which pulleys 17 and 18 are fixed. Pulley 17 transmits power via a belt to mower deck 5 so as to drive the rotary blades. Pulley 18 transmits power via a belt to hydraulic pumps 21 and 22 in pump unit 16 so as to drive a drive and steer device 11 disposed between drive wheels 3. Drive and steer device 11 is provided with right and left axles 30L and 30R extended laterally outward therefrom to engage at outer ends thereof with respective drive wheels 3.

A driver's seat 8 is disposed on the top of engine cover 7 mounted on the rear portion of frame 4. A platform 13 is spread over a front portion of frame 4 in front of engine cover 7. A steering wheel 9 is disposed above a control box 10 on a top of a pillar 12 erected from platform 13 in front of seat 8.

As understood from FIGS. 2 and 3, with respect to vehicle 1, pillar 12 is disposed laterally eccentrically (rightward in this embodiment) and control box 10 is extended horizontally laterally inward from the top of pillar 12, thereby locating steering wheel 9 at the lateral middle portion of vehicle 1.

In front of seat 8, a grip bar 14 is erected from platform 13 laterally opposite to pillar 12 (leftward in this embodiment) and bent laterally inward at its top portion so as to be gripped by a hand of an operator sitting on seat 8, thereby stabilizing the operator.

In front of pillar 12 and grip bar 14, a seesaw-like accelerator foot pedal 15 is disposed above platform 13. Accelerator pedal 15 is depressed forward (a front end of pedal 15 is depressed) for forward traveling of vehicle 1, and it is depressed backward (a rear end of pedal 15 is depressed) for backward traveling of vehicle 1.

Figure 4:
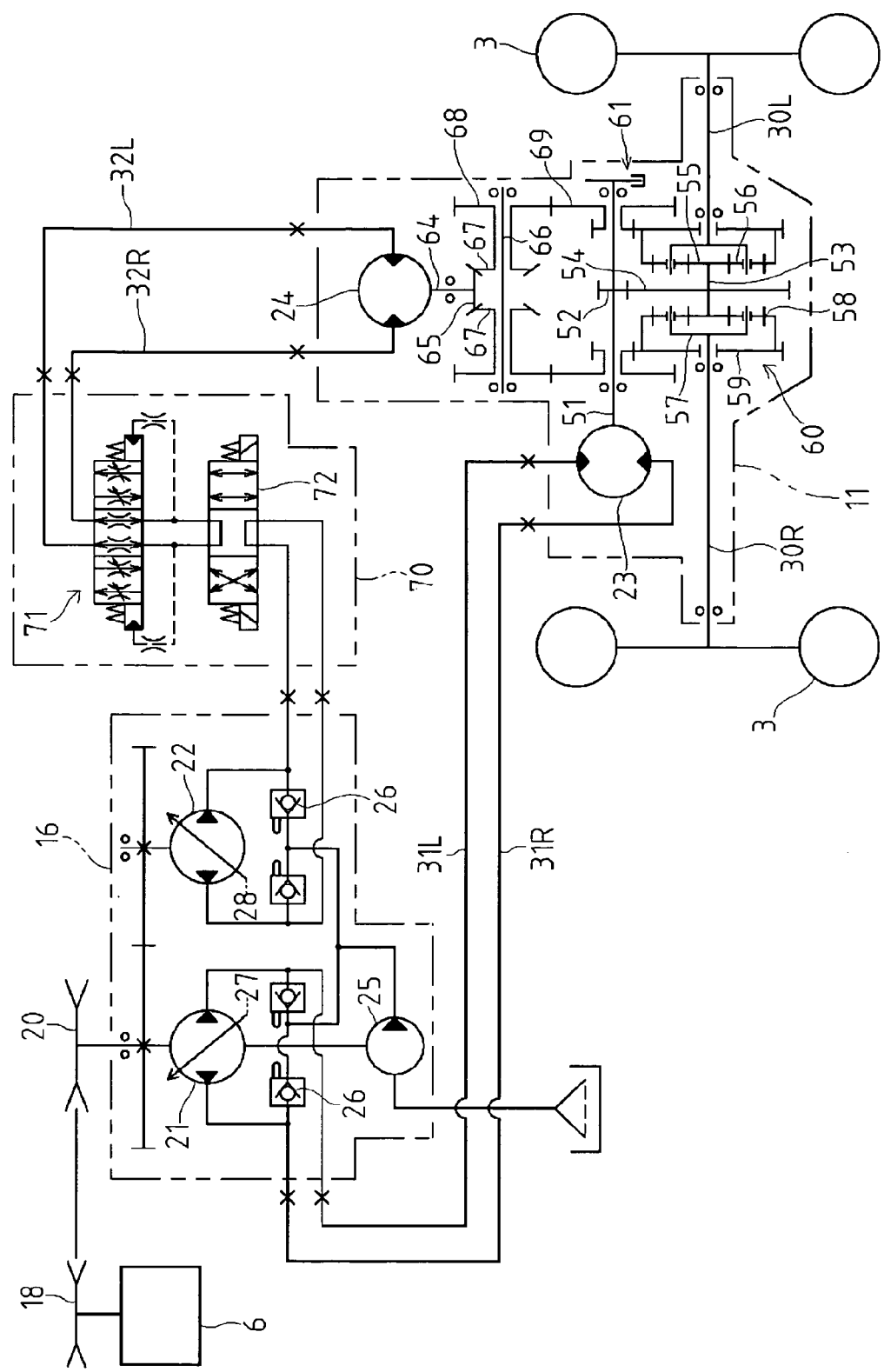
FIG. 4 is a diagram of hydraulic circuit and structure of a hydraulic apparatus for driving and steering the vehicle.

Referring to FIG. 4, drive and steer device 11 will be described. Drive and steer device 11 incorporates hydraulic motors 23 and 24 and a differential gearing 60 differentially connecting axles 30R and 30L. Hydraulic traveling motor 23 is fluidly connected to hydraulic traveling pump 21 in pump unit 16 via pipes so as to constitute a traveling HST, and hydraulic steering motor 24 is fluidly connected to hydraulic steering pump 22 in pump unit 16 via pipes so as to constitute a steering HST.

Pump unit 16 has a common vertically downward input shaft 20 for driving both hydraulic pumps 21 and 22, which receives power of engine 6 via the belt from pulley 18.

The pipes are interposed between pump unit 16 and drive and steer device 11 so as to constitute a pair of hydraulic oil passages 31L and 31R between hydraulic traveling pump 21 and motor 23, and a pair of hydraulic oil passages 32L and 32R between hydraulic steering pump 22 and motor 24.

Each of variable displacement hydraulic pumps 21 and 22 delivers oil to each of hydraulic motors 23 and 24. A traveling control linkage 27 is provided for controlling the quantity and direction of oil delivered from traveling pump 21, and a steering control linkage 28 for controlling the quantity and direction of oil delivered from steering pump 22.

In pump unit 16, a charge pump 25 is provided on the extension of the pump shaft of traveling pump 21 so as to be driven together with pump 21. Charge pump 25 supplies common oil to passages 31R and 31L and passages 32R and 32L through respective check valves 26 for preventing oil reduction in each of the HSTs. Incidentally, when a later-discussed control valve unit 70 or 80 interposed between hydraulic steering pump 22 and motor 24 is referred to, the twin passages between control valve unit 70 or 80 and steering motor 24 are especially defined as passages 32R and 32L.

Figure 6:
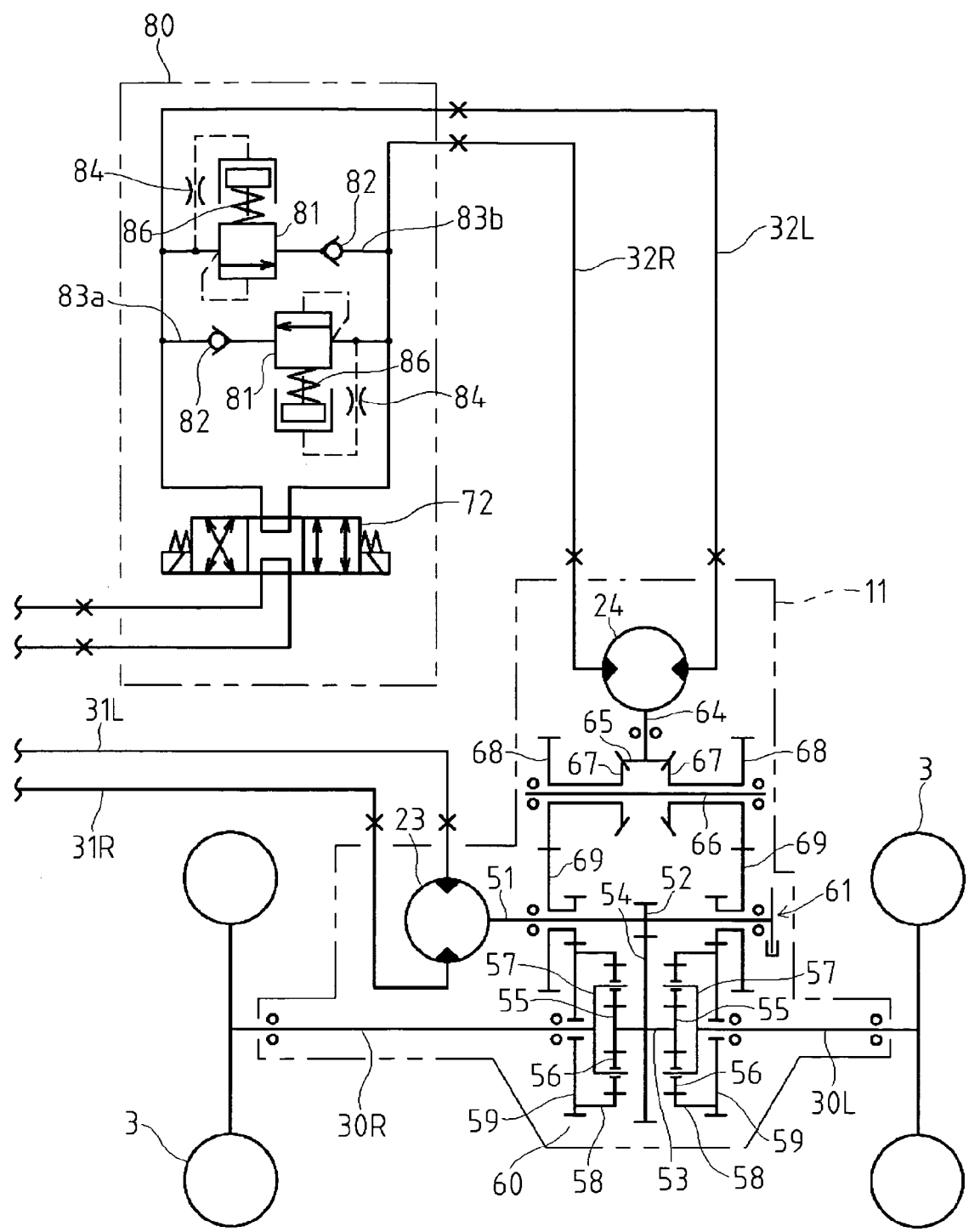
FIG. 6 is a diagram of hydraulic circuit and structure of another hydraulic apparatus for driving and steering the vehicle.

Referring to FIGS. 4 and 6, traveling motor 23 has an output (motor) shaft 51 on which a gear 52 is fixed. Further, a brake device 61 is disposed on a tip portion of output shaft 51. A center gear 54 is fixed on a shaft 53 coaxially disposed between axles 30R and 30L, and meshes with gear 52. Shaft 53 is fixedly provided on its opposite ends with respective sun gears 55. Each of sun gears 55 meshes on its outer periphery with planetary gears 56. Axles 30R and 30L are fixedly provided on their mutually facing proximal ends with respective carriers 57. Each of carriers 57 pivotally supports planetary gears 56 meshing with each of sun gears 55. A pair of gears 59 are freely rotatably supported on respective axles 30R and 30L. An internal gear 58 is integrally provided on each of gears 59 so as to mesh with planetary gears 56 meshing with each sun gear 55. In this way, differential gearing 60 is constructed to transmit output power of traveling motor 23 to axles 30R and 30L.

Steering motor 24 has a motor shaft 64 perpendicular to output shaft 51 of traveling motor 23. A bevel gear 65 is fixed on motor shaft 64. A shaft 66 is disposed perpendicular to motor shaft 64. A pair of opposite bevel gears 67 are freely rotatably disposed on shaft 66 and mesh with bevel gear 65. Bevel gears 67 are integrally provided on their distal ends with respective gears 68. A pair of double gears 69 are freely rotatably disposed on output shaft 51 of traveling motor 23 with gear 53 therebetween. Each of double gear 69 has a large gear portion meshing with each of gears 68, and a small gear portion meshing with each of gears 59. When motor shaft 24 is rotated, bevel gears 67 are rotated in opposite directions and transmits power through the two drive trains of differential gearing 60 to respective axles 30R and 30L, whereby one of axles 30R and 30L is accelerated and the other axle 30L or 30R is decelerated in the same direction, or axles 30R and 30L are accelerated in opposite directions.

As shown in FIG. 4, a control valve unit 70 is disposed between pump 22 and motor 24 of the steering HST over hydraulic oil passages 32R and 32L of the steering HST. Control valve unit 70 comprises a switching valve 72 and a counterbalance valve 71. Switching valve 72 is provided for ensuring the reverse steering logic. Switch valve 72 has three positions, i.e., a separation position and first and second open positions. Steering pump 22 has first and second ports to be connected to motor 24. When accelerator pedal 15 is depressed for forward traveling, switching valve 72 is set in the first open position so as to connect the first port of pump 22 to passage 32R and to connect the second port of pump 22 to passage 32L. When accelerator pedal 15 is depressed for backward traveling, switching valve 72 is set in the second open position so as to connect the first port of pump 22 to passage 32L and to connect the second port of pump 22 to passage 32R. When accelerator pedal 15 is not depressed, switching valve 72 is set in the separation position so as to connect the first and second ports of pump 22 to each other and to connect passages 32R and 32L to each other, thereby fluidly separating motor 24 from pump 22.

Preferably, switching valve 72 is a three-position solenoid valve. To achieve the association of solenoid position of switching valve 72 with depression of pedal 15, a switch or switches are disposed adjacent to pedal 15 so as to be switched depending on whether pedal 15 is depressed or not. Alternatively, switching valve 72 may have a spool connected to pedal 15 via a mechanical linkage. Any construction is allowed if depression of pedal 15 for forward traveling, depression thereof backward traveling, and the neutral position of pedal 15 correspond to the respective three positions of switching valve 72.

The positional selection of switching valve 72 between the first and second open positions depends on whether accelerator pedal 15 is depressed for forward traveling or backward traveling, as mentioned above. The movable swash plate of traveling pump 21 is linked to accelerator pedal 15, and the movable swash plate of steering pump 22 to steering wheel 9. While both pumps 21 and 22 driven by engine 6 are rotated in fixed directions, which direction oil flows in through each of hydraulic pumps 21 and 22 depends on which side the swash plate of each of pumps 21 and 22 is slanted to from its neutral position. Motor shaft 51 of traveling motor 23 is selectively rotated in one of opposite directions depending on whether accelerator pedal 15 is depressed for forward traveling or backward traveling.

If steering wheel 9 is rotated rightward to a particular angle from the straight traveling position, the swash plate of steering pump 22 is slanted to a particular angle in one selective direction (for right turning of vehicle 1) from its neutral position whether accelerator pedal 15 is depressed for forward traveling or backward traveling. While the swash plate of pump 22 is held in place, motor shaft 64 is selectively rotated in one of opposite directions depending on whether switching valve 72 is set in the first open position or the second open position.

It is now assumed that the first open position of valve 72 corresponds to depression of pedal 15 for forward traveling, and the second open position of valve 71 corresponds to depression of pedal 15 for backward traveling. If accelerator pedal 15 is depressed for forward traveling, motor shaft 51 is rotated in one direction selected by depression of pedal 15 for forward traveling, and motor shaft 64 is rotated in one direction selected by the rightward rotation of steering wheel 9 and the setting of valve 72 to the first open position so that the rotational speed of left axle 30L in forward traveling is increased and the rotational speed of right axle 30R in forward traveling is decreased.

On the other hand, if accelerator pedal 15 is depressed for backward traveling, motor shaft 51 is rotated in the other direction selected by depression of pedal 15 for backward traveling, and motor shaft 64 is also rotated in the other direction selected by the rightward rotation of steering wheel 9 and the setting of valve 72 to the second open position, wherein the ports of motor 24 corresponding to the first and second ports of pump 22 when setting valve 72 is in the first open position are exchanged for each other, so that the rotational speed of left axle 30L in backward traveling is increased and the rotational speed of right axle 30R in backward traveling is decreased. Consequently, vehicle 1 turns rightward by the rightward turning of steering wheel 9 whether vehicle 1 travels forward or backward. Similarly, due to the switching of valve 72, vehicle 1 turns leftward by the leftward turning of steering wheel 9 whether vehicle travels forward or backward.

It is now supposed that the depression of accelerator pedal 15 for forward traveling is changed for backward traveling while vehicle 1 is turning left. The above-mentioned switching of valve 72 from the first open position to the second open position is performed so that, as far as steering wheel 9 is held, vehicle 1 travels backward along the left turning route thereof having traveled forward. Further, the backward traveling speed is the same as of the forward traveling speed just before because the swash plate of steering pump 22 is held so as to keep the constant differential rotation speed of axles 30L and 30R. However, the exchange of oil passages in the steering HST by valve 72 tends to cause uncomfortable sudden change of oil flow and pressure.

Figure 5:
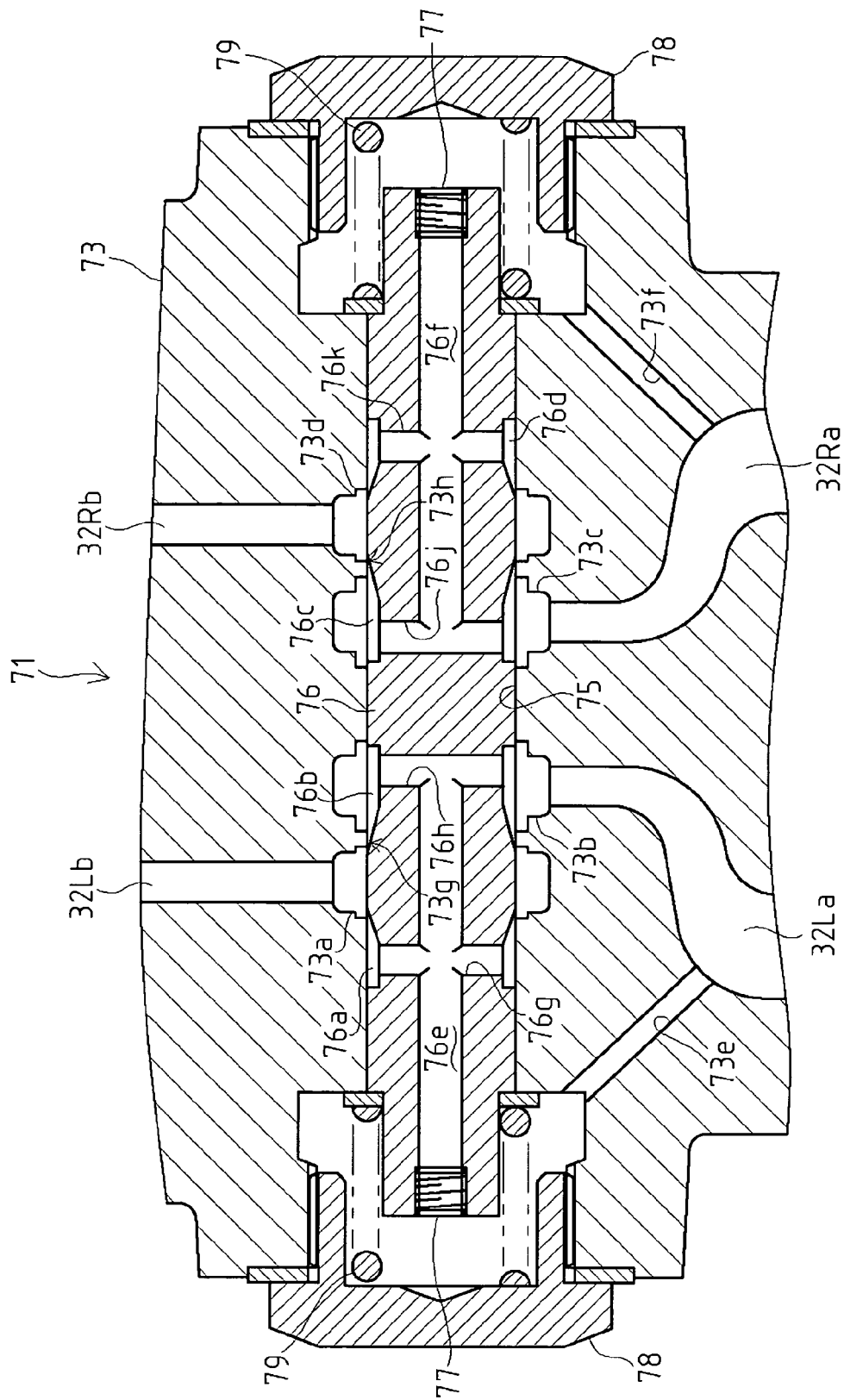
FIG. 5 is a sectional view of a counterbalance valve in a valve casing for the apparatus of FIG. 4.

Referring to FIGS. 4 and 5, counterbalance valve 71 for solving such a problem will be described. Counterbalance valve 71 is a hydraulic pilot valve having three positions for reducing oil flow and changing the direction of oil flow. A cylindrical valve casing 73 is axially penetrated by a valve chamber 75. Cylindrical valve casing 73 is bored by substantially radial and symmetrical oil passages 32La, 32Ra, 32Lb and 32Rb open to valve chamber 75. The ends of passages 32La, 32Ra, 32Lb and 32Rb open to valve chamber 75 are expanded so as to form annular grooves 73a, 73b, 73c and 73d around valve chamber 75. Oil passages 32Ra and 32La are extended to switching valve 72, and oil passages 32Rb and 32Lb to steering motor 24.

A spool 76 is slidably fitted in valve chamber 75. Annular grooves 76a, 76b, 76c and 76d are formed on the peripheral surface of spool 76 so as to correspond to respective annular grooves 73a, 73b, 73c and 73d. Spool 76 is penetrated by diametrical channels 76g, 76h, 76j and 76k open to respective annular grooves 76a, 76b, 76c and 76d. A pair of axial channels 76e and 76f bores spool 76. Axial channel 76e is extended from one end of spool 76 to diametrical channel 76h through diametrical channel 76g so as to connect channels 76g and 76h to each other. Axial channel 76f is extended from the other end of spool 76 to diametrical channel 76j through diametrical channel 76k so as to connect channels 76j and 76k to each other. Plugs 77 plug the respective open ends of axial channels 76e and 76f.

Each of the open end sections of valve chamber 75 outward from each end of spool 76 set at its central position is axially expanded so as to form an oil gallery allowing spool 76 to slide therein, and closed from the outside by respective lids 78. The oil gallery at each end of valve chamber 75 is also expanded radially so as to be provided therein with a spring 79 interposed between spool 76 and lid 78. The pair of springs 79 bias spool 76 in opposite directions toward the central position serving as the separation position of valve 71.

The oil galleries at the opposite ends of valve chamber 75 are filled of pilot oil for sliding spool 76. Valve casing 73 is formed therein with a pair of pilot oil passages 73e and 73f extended from respective oil passages 32La and 32Ra to the respective oil galleries.

It is assumed that switching valve 72 is set in either the first or second open position. When steering wheel 9 is kept in its straight traveling position so as to keep steering pump 22 in neutral, hydraulic oil pressures of passages 32La and 32Ra are substantially equal so that the pilot oil pressures in the opposite oil galleries are substantially balanced while spool 76 is kept in the central position by biasing of springs 79, as shown in FIG. 5. At this time, annular grooves 76b and 76c of spool 76 properly coincide with respective annular grooves 73b and 73c so as to bring channels 76e, 76g and 76h and channels 76f, 76j and 76k into fluid communication with respective hydraulic oil passages 32La and 32Ra. Annular groove 73a of passage 32Lb is disposed between annular grooves 76a and 76b. Annular grooves 76a and 76b are narrowed at their ends facing each other. Annular grooves 76a and 76b are slightly opened at their narrowed ends to annular groove 73a therebetween so as to serve as an orifice 73g in communication with hydraulic oil passage 32Lb. Similarly, annular grooves 76c and 76d are slightly opened at their narrowed facing ends to annular groove 73d therebetween so as to serve as an orifice 73h in communication with hydraulic oil passage 32Rb. Thus, when spool 76 is set in the central position, the amount of oil flowing between hydraulic oil passages 32La and 32Lb and between hydraulic oil passages 32Ra and 32Rb is very small.

When steering wheel 9 is turned rightward or leftward from its straight traveling position, steering pump 22 delivers oil so that one of hydraulic oil passages 32La and 32Ra is hydraulically pressured higher than the other. Pilot oil passage 73e or 73f connected to higher-pressured passage 32La or 32Ra supplies the higher-pressured oil to the corresponding oil gallery, and the other pilot oil passage 73f or 73e allows oil to flow from the corresponding oil gallery to the corresponding depressed passage 32Ra or 32La. Such a difference of hydraulic pressure between the opposite oil galleries causes spool 76 to slide from the higher-pressured oil gallery to the depressed oil gallery against the biasing force of springs 79.

If the hydraulic oil pressure in passage 32La is higher than that in passage 32Ra, spool 76 slides rightward (in FIG. 5). As steering wheel 9 is rotated from the straight traveling position, the area of annular groove 76a open to annular groove 73a and the area of annular groove 76d open to annular groove 73d are gradually expanded while almost keeping annular grooves 76b and 76c in proper fluid communication with respective annular grooves 73b and 73c, thereby gradually expanding the areas of orifices 73g and 73h until grooves 76a and 76d are properly connected to respective grooves 73a and 73d. Therefore, during the early period of the sliding of spool 76 from its central position, i.e., the turning of steering wheel 9 from its straight traveling position, the fluid communication between hydraulic steering pump 22 and motor 24 is restricted so as to restrict the output rotation of steering motor 24, thereby preventing sudden turning of vehicle 1.

Figure 7:
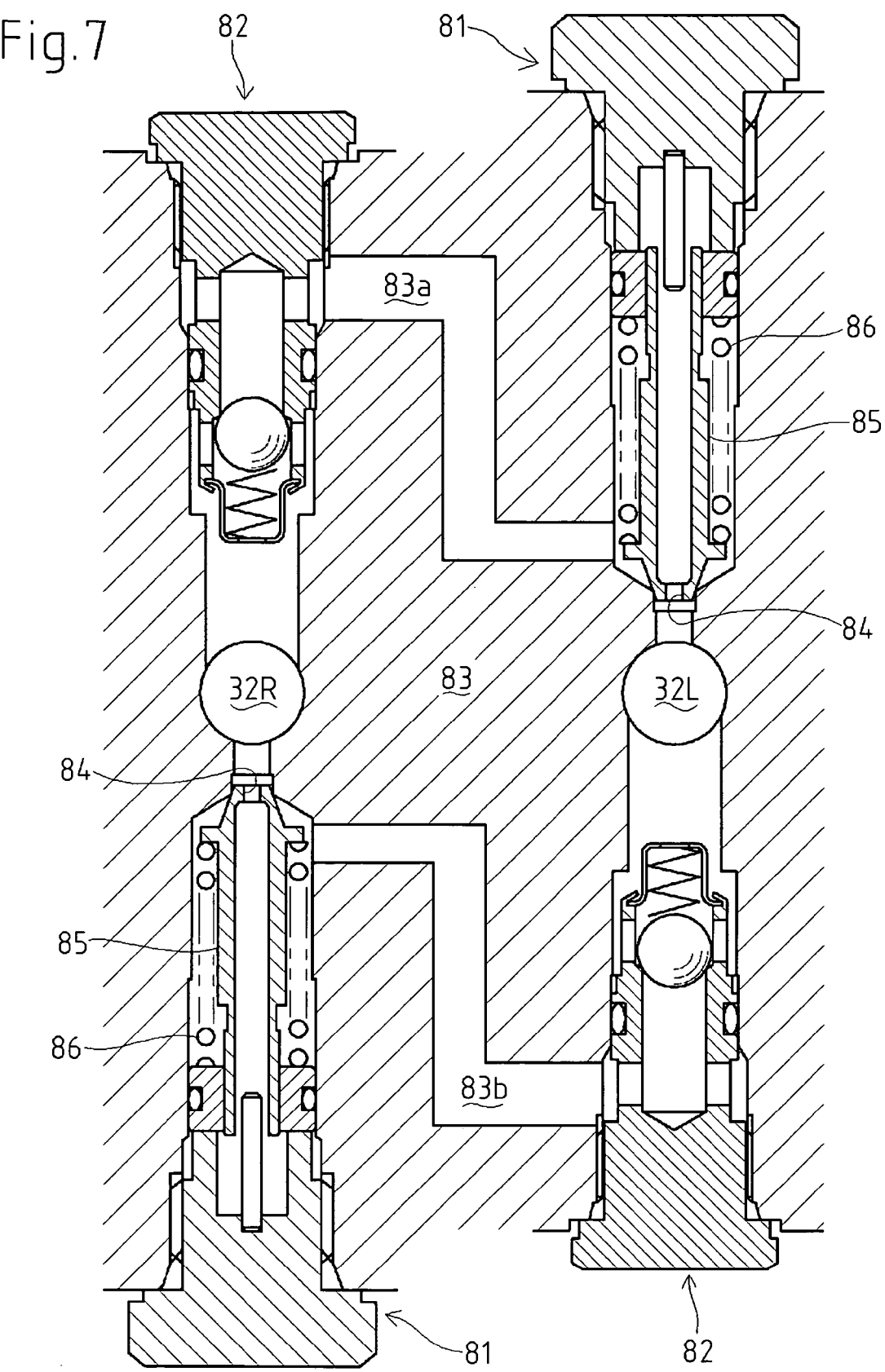
FIG. 7 is a sectional view of relief valves and check valves in a valve casing for the apparatus of FIG. 6.

Referring to FIGS. 6 and 7, an alternative control valve unit 80 will be described. The same switching valve 72 is provided in control valve unit 80. In control valve unit 80, two valve combinations, each of which comprises a delay relief valve 81 and a check valve 82, are interposed between hydraulic oil passages 32L and 32R. Each combination of delay relief valve 81 and check valve 82 is provided on each of first and second oil passages 83a and 83b between passages 32L and 32R.

Delay relief valve 81 has a valve member 85, which is biased by a spring 86 so as to fit a valve seat, i.e., close valve 81. Hydraulic oil pressure from corresponding passage 32L or 32R moves valve member 85 against spring 86 so as to open valve 81, i.e., to allow oil to flow from the corresponding passage 32L or 32R to corresponding check valve 82, whereby check valve 82 is opened so as to allow oil to flow from corresponding delay relief valve 81 to the other passage 32R or 32L. As delay relief valve 81 is supplied with oil from the corresponding passage 32L or 32R, a part of the supplied oil penetrates valve member 85 through orifice 84 and functions as counter pressure against the oil supplied from the corresponding passage 32L or 32R. Finally, the counter pressure makes valve member 85 fit the valve seat to close valve 81. Check valve 82 allows only oil flow from corresponding delay relief valve 81 and prevents oil from flowing to corresponding valve 81 therefrom.

Generally, if the hydraulic oil pressure in passage 32L is higher than that in passage 32R, oil in passage 32L flows from pump 22 to motor 24, and oil in passage 32R flows from motor 24 to pump 22. Oil flowing in passage 32L from pump 22 to motor 24 is prevented from flowing to passage 32R via first oil passage 83a by check valve 82 on passage 83a. A part of oil flowing in higher-pressured oil passage 32L is allowed to pass through second oil passage 83b if delay relief valve 81 on passage 83b is opened.

In this way, during the early period of the turning of steering wheel 9 from its straight traveling position, either valves 81 and 82 on passage 83a or valves 81 and 82 on passage 83b are opened to flow a part of oil between passages 32L and 32R bypassing steering motor 24, thereby restricting the output rotation of steering motor 24 and preventing sudden turning of vehicle 1. As steering wheel 9 is further rotated, opened delay relief valve 81 is closed and corresponding check valve 82 is also closed. Thus, oil is circulated between passages 32L and 32R via steering motor 24 without flowing each of passages 83a and 83b, thereby ensuring the most volume efficiency of pump 22 for driving motor 24.

Instead of switching valve 72 for exchanging the ports of motor 24 corresponding to the respective ports of pump 22, steering control linkage 28 may be alternatively modified to exchange the rotational direction of the swash plate of pump 22 corresponding to the respective right and left turnings of steering wheel 9, as shown in FIGS. 8 to 11. FIG. 3 illustrates a part of the modified linkage 28. In control box 10, a sprocket 29 is fixed on the pivot shaft of steering wheel 9, a sprocket 33 on a top end of a vertical steering shaft 34 extended through pillar 12, and a chain 49 is interposed between sprockets 29 and 33. A bottom end of steering shaft 34 projects downward from pillar 12 and fixedly provided thereon with a steering pinion 35. A substantially horizontal switching plate 36 is disposed just behind steering pinion 35 and provided at its front end with a sector gear 36f meshing with steering pinion 35, thereby being rotated according to turning of steering wheel 9.

Figure 9:
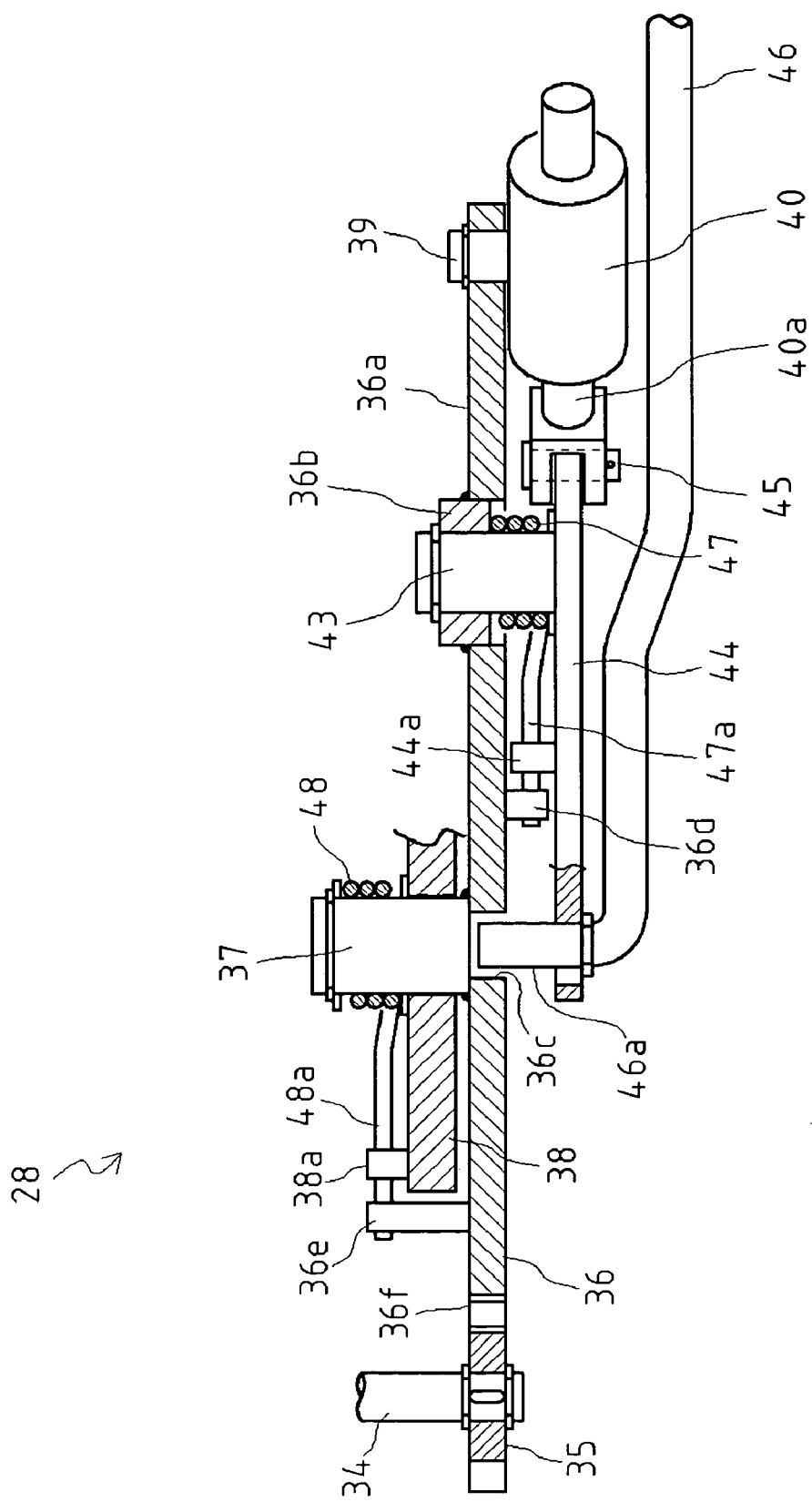
FIG. 9 is a sectional side view of the steering control linkage.

As best shown in FIG. 9, an upright pivot shaft 37 is fixed onto a substantially one-third backward portion of switching plate 36 from its front end so as to be horizontally rotatably supported by a support plate 38 fixed to the body of vehicle 1. Namely, switching plate 36 is pivoted so as to be laterally rotatable around the vertical axis of pivot shaft 37. Switching plate 36 has an arm portion 36a extended backward from pivot shaft 37. A substantially vertical pivot pin 39 is pivotally fitted at its upper end into a rear end of arm portion 36a of switching plate 36, and fixed at its lower end to a hydraulic cylinder 40, thereby horizontally rotatably pivoting cylinder 40 onto the rear end of switching plate 36.

Double-acting hydraulic cylinder 40 has two ports, i.e., a rod side port and a head side port, connected to hydraulic pump 41 via a directive control valve 42 and a switching valve 49. Directive control valve 42 has three positions, i.e., a neutral position and first and second acting positions associated with the respective three conditional patterns of pedal 15. Switching valve 49 has two positions, i.e., a fist position for connecting pump 41 and a drain tank to the respective ports of cylinder 40 via valve 42, and a second position for separating both of the ports of cylinder 40 from pump 41 and the drain tank so as to fix the piston of cylinder 40.

Unless pedal 15 is depressed, valve 42 is set in the neutral position, where the two ports of cylinder 40 are connected to each other so as to allow the piston rod of cylinder 40 to move freely. When pedal 15 is depressed for forward traveling, valve 42 is set in the first acting position so as to connect pump 41 to the head side port of cylinder 40, and connect the drain tank to the rod side port of cylinder 40, thereby extending a piston rod 40a of cylinder 40. When pedal 15 is depressed for backward traveling, valve 42 is set in the second acting position so as to connect pump 41 to the rod side port of cylinder 40, and connect the drain tank to the head side port of cylinder 40, thereby contracting a piston rod 40a of cylinder 40.

Figure 8:
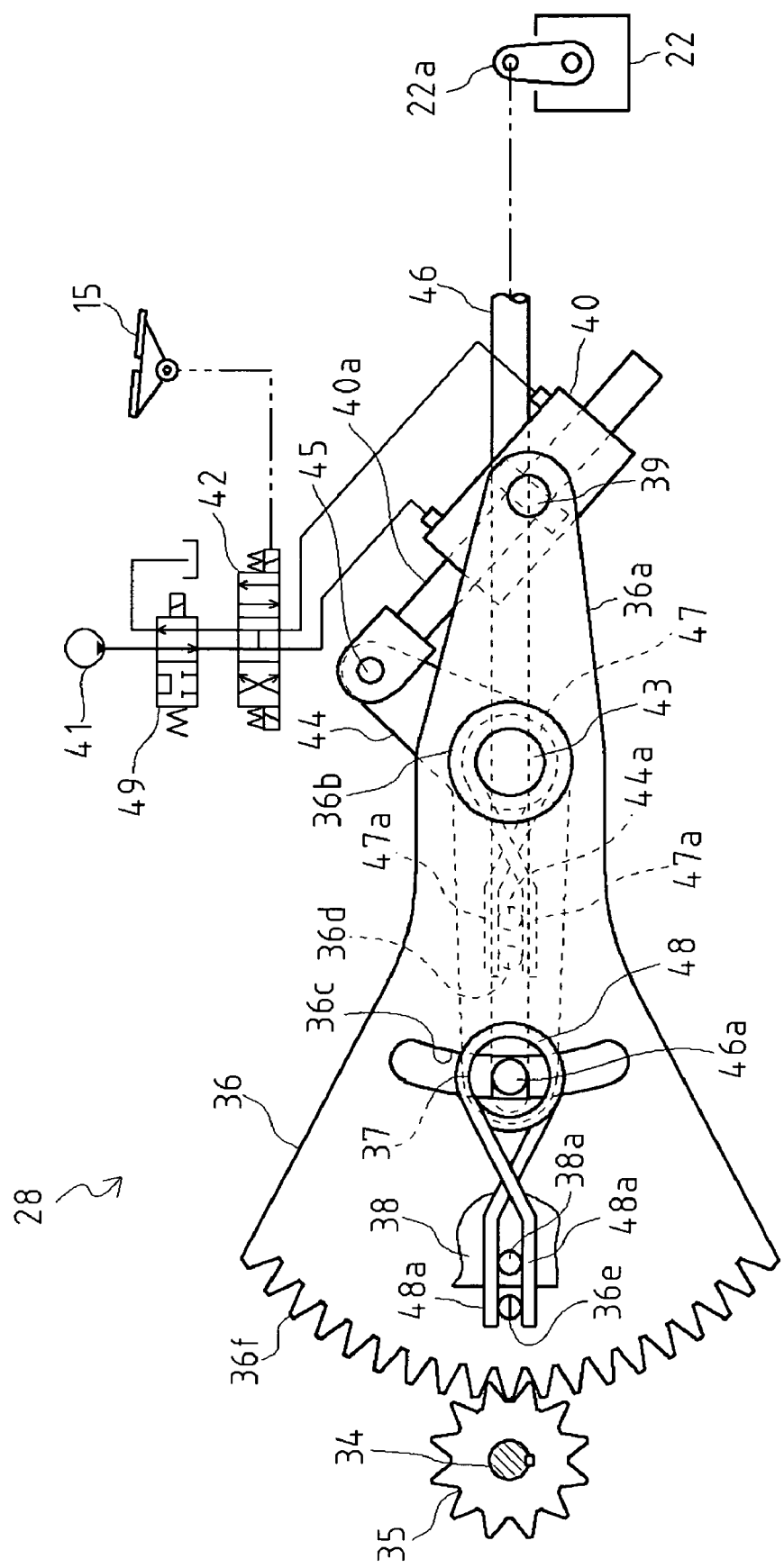
FIG. 8 is a plan view of a steering control linkage.

FIG. 8 illustrates a solenoid valve serving as a typical example of directive control valve 42, which is actuated based on the switching on/off of a switch (not shown) disposed adjacent to pedal 15. Alternatively, directive control valve 42 may have a spool mechanically linked to pedal 15. Further, the hydraulic actuation system for switching plate 36 may be replaced with an air, electric, or another actuation system.

Arm portion 36a of switching plate 36 is formed with an annular vertical boss 36b at its fore-and-aft intermediate position (a substantially one-third forward position of switching plate 36 from its rear end). A substantially vertical pivot shaft 43 is pivotally fitted at its top portion into boss 36b, and fixed at its bottom end to a control lever 44 disposed below arm portion 36a of switching plate 36. Control lever 44 is doglegged when viewed in plan, and pivoted at its bent intermediate portion via pivot shaft 43 to switching plate 36. Control lever 44 is pivotally coupled at its rear end with piston rod 40a of cylinder 40 via a pin 45 so as to be rotated around the substantially vertical axis of pivot shaft 43 by telescoping movement of piston rod 40a. A link rod 46 is extended in substantially fore and aft direction, and pivotally coupled at its rear end with a swash plate control arm 22a of pump 22 (typically, arm 22a projects outward from pump unit 16). Link rod 46 has a substantially vertically bent front end 46a which is pivotally fitted upward into the front end of control lever 44.

Switching plate 36 is bored by an arcuate slot 36c having a part beneath of pivot shaft 37 serving as the pivot for lateral rotation of plate 36. Substantially vertical front end 46a of link rod 46 penetrates the front end of control lever 44 and is slidably fitted at its top end into slot 36c. When viewed in plan as shown in FIG. 8, slot 36c is extended rightward and leftward from the axis of pivot shaft 37 and curved backward at its right and left ends, so that slot 36c is laterally symmetrical with respect to the axis of pivot shaft 37. By telescoping of piston rod 40a of cylinder 40, front end 46a of link rod 46 slides along slot 36c so as to move link rod 46 for rotating control arm 22a, thereby moving the swash plate of steering pump 22.

The middle point in slot 36c coinciding with the axis of pivot shaft 37 serves as a neutral position of front end 46a of link rod 46 for locating control arm 22a at its neutral position. Front end 46a of link rod 46 reaching the neutral position is disposed coaxially to pivot shaft 37. Control arm 22a has two opposite rotational ranges with respect to the neutral position: one for forward traveling; and the other for backward traveling. The area of slot 36c rightward from the neutral position is provided to locate control arm 22a into one of the two opposite rotational ranges, and the area of slot 36c leftward from the neutral position is provided to locate control arm 22a into the other rotational range.

A pin 36d projects downward from arm portion 36a of switching plate 36 between pivot shafts 37 and 43. A pin 44a projects upward from control lever 44 just before pin 36d. A spring 47 is coiled around pivot shaft 43 between boss 36b and control lever 44, and its both end portions 47a cross each other and extend forward so as to pinch pins 36d and 44a, thereby biasing control lever 44 so as to return control arm 22a to its neutral position via link rod 46, i.e., to return the swash plate of steering pump 22 to its neutral position.

A pin 38a projects upward from the front end portion of support plate 38 before pivot shaft 37, and a pin 36e projects upward from switching plate 36 just before pin 38a. A spring 48 is coiled around pivot shaft 37 on the top surface of support plate 38, and its both end portions 48a cross each other and extend forward so as to pinch pins 38a and 36e, thereby biasing switching plate 36 so as to return steering wheel 9 to its straight traveling position.

In this way, switching plate 36 is provided with a neutral returning mechanism including springs 47 and 48 for returning control lever 22a and steering wheel 9 to their initial positions.

The operation of steering control linkage 28 basing on operating accelerator pedal 15 and steering wheel 9 will be described. It is now assumed that control arm 22a and the swash plate of steering pump 22 are moved to increase the forward traveling speed of vehicle 1 by extension of piston rod 40a of cylinder 40, and to increase the backward traveling speed of vehicle 1 by contraction of piston rod 40a. However, the relation of extension and contraction of piston rod 40a to the moving direction of control arm 22a may be reversed.

Unless pedal 15 is depressed, as shown in FIG. 8, directive control valve 42 is set in its neutral position so that control lever 44 is kept by spring 47 so as to hold front end 46a of link rod 46 at the laterally middle neutral position in slot 36c. Steering wheel 9 is held at its straight traveling position by spring 48. In this state, if steering wheel 9 is turned from the straight traveling position by mistake, control lever 44 and hydraulic cylinder 40 are rotated integrally with switching plate 36 around pivot shaft 37, however, front end 46a of link rod 46 remains at the neutral position in slot 36c. Therefore, link rod 46 is prevented from moving to rotate control arm 22a and the swash plate of pump 22 from their neutral positions. Therefore, steering pump 22 is kept in neutral so as to prevent vehicle 1 from unexpectedly spinning.

Figure 10:
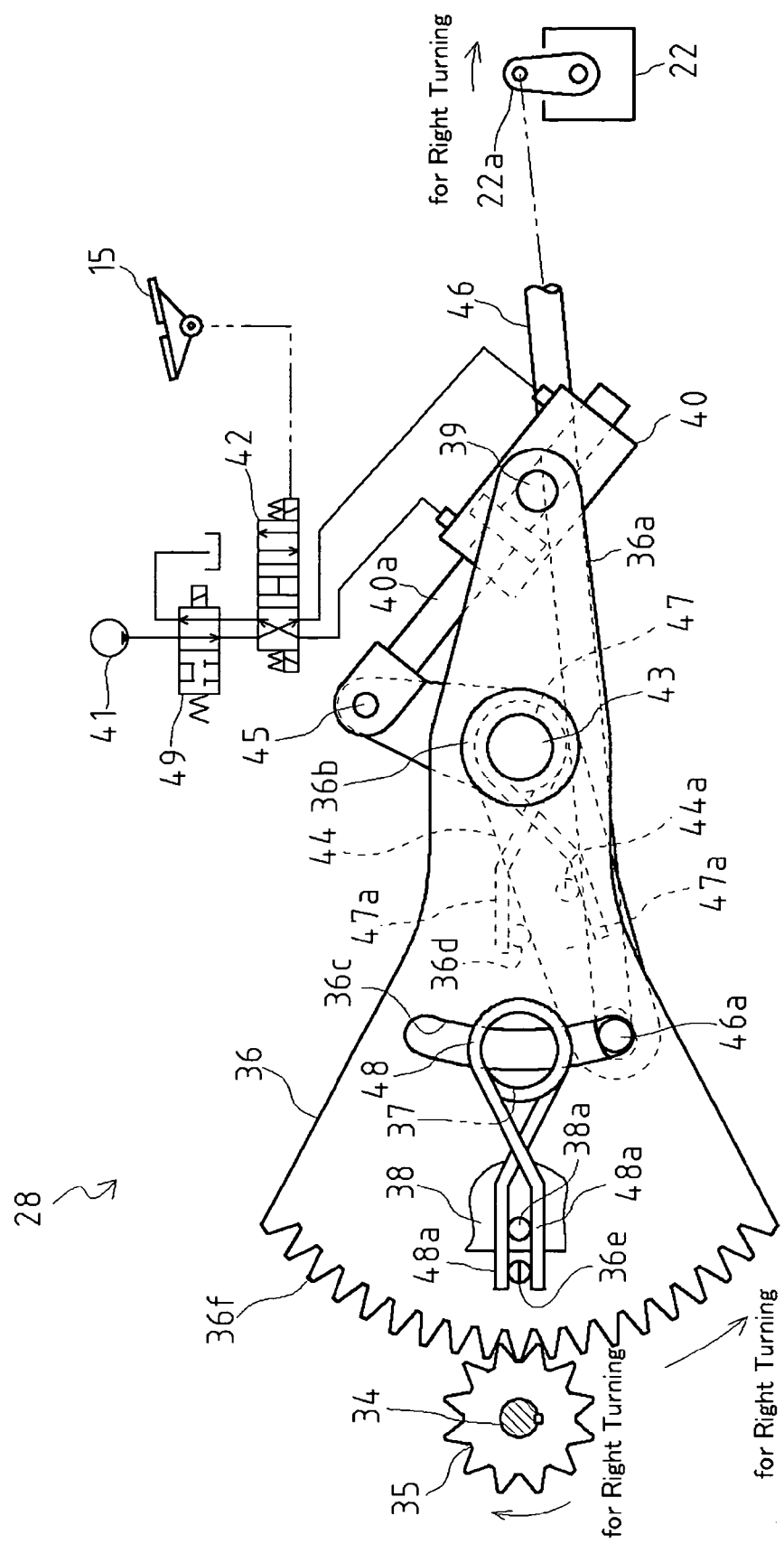
FIG. 10 is a plan view of the steering control linkage when the vehicle travels forward.

Referring to FIG. 10, by depressing pedal 15 for forward traveling, directive control valve 42 is set at its forward traveling position so as to extend piston rod 40a of cylinder 40. Control lever 44 is pushed by extended piston rod 40a so as to rotate around pivot shaft 43, thereby pressing front end 46a of link rod 46 against the right end of slot 36c (when viewed in front).

Arrows drawn in FIG. 10 designate respective rotational directions of pinion 35, switching plate 36 and control arm 22a when steering wheel 9 is rotated rightward for right turning of forward traveling vehicle 1. By rotating steering wheel 9 rightward, switching plate 36 meshing with pinion 35 is rotated counterclockwise. Link rod 46 with front end 46a in the right end of slot 36c is pushed backward by the counterclockwise rotation of switching plate 36, whereby control arm 22a is rotated backward so as to decelerate forwardly rotating right axle 30R and accelerate forwardly rotating left axle 30L, thereby turning vehicle 1 rightward.

On the contrary, by rotating steering wheel 9 leftward, switching plate 36 is rotated clockwise. Link rod 46 with front end 46a in the right end of slot 36c is pulled forward by the clockwise rotation of switching plate 36, whereby control arm 22a is rotated forward so as to decelerate forwardly rotating left axle 30L and accelerate forwardly rotating right axle 30R, thereby turning vehicle 1 leftward.

Figure 11:
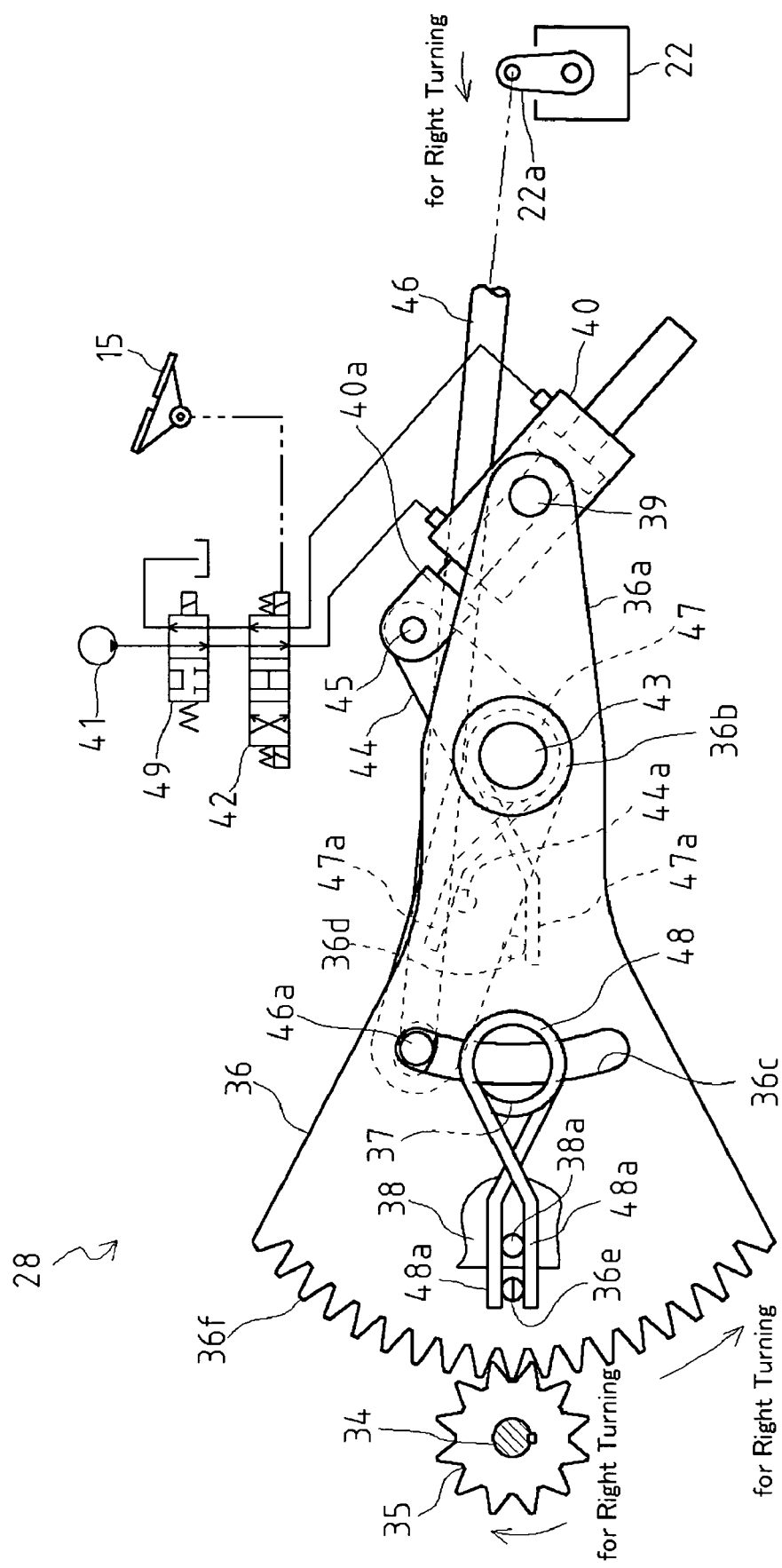
FIG. 11 is a plan view of the steering control linkage when the vehicle travels backward.

Referring to FIG. 11, by depressing pedal 15 for backward traveling, directive control valve 42 is set at its backward traveling position so as to contract piston rod 40a of cylinder 40. Control lever 44 is pulled by contracted piston rod 40a so as to rotate around pivot shaft 43, thereby putting front end 46a of link rod 46 in the left end of slot 36c (when viewed in front).

Arrows drawn in FIG. 11 designate respective rotational directions of pinion 35, switching plate 36 and control arm 22a when steering wheel 9 is rotated rightward for right turning of backward traveling vehicle 1. If steering wheel 9 is rotated rightward from the straight traveling position, switching plate 36 meshing with pinion 35 is rotated counterclockwise around pivot shaft 37. However, link rod 44 with front end 44a in the left end of slot 36c is pulled forward by the counterclockwise rotation of switching plate 36, whereby control arm 22a is rotated forward so as to decelerate backwardly rotating right axle 30R and accelerate backwardly rotating left axle 30L, thereby turning vehicle 1 rightward.

On the contrary, if steering wheel 9 is rotated leftward from the straight traveling position, switching plate 36 meshing with pinion 35 is rotated clockwise around pivot shaft 37. Link rod 44 with front end 44a in the left end of slot 36c is pushed backward by the clockwise rotation of switching plate 36, whereby control arm 22a is rotated backward so as to decelerate backwardly rotating left axle 30L and accelerate backwardly rotating right axle 30R, thereby turning vehicle 1 leftward.

If steering wheel 9 is released from operating force, rotated switching plate 36 returns to its initial neutral position by biasing force of spring 48 so as to return steering wheel 9 to its straight traveling position. If accelerator pedal 15 is released from depressing force, directive control valve 42 returns to its neutral position so that control lever 44 returns to the initial neutral position by biasing force of spring 47, thereby returning the swash plate of steering pump 22 to the neutral position.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A hydraulically driven and steered vehicle, comprising:
   a pair of axles differentially connected to each other;
   a prime mover;
   a speed control operation device for controlling the traveling speed of the vehicle and switching the traveling direction of the vehicle between forward and backward;
   a traveling HST including
      a variable displacement hydraulic traveling pump drivingly connected to said prime mover, said traveling pump having a movable swash plate operatively connected to said speed control operation device, and
      a hydraulic traveling motor fluidly connected to said traveling pump and drivingly connected to said axles so as to drive said axles at the same various speed in the same forward or backward direction;
   a steering operation device for turning the vehicle;
   a steering HST including
      a variable displacement hydraulic steering pump drivingly connected to said prime mover, said steering pump having a movable swash plate, and
      a hydraulic steering motor fluidly connected to said steering pump and drivingly connected to said axles so as to drive said axles differentially; and
   a steering control linkage operatively interposed between said steering operation device and said swash plate of said steering pump, said steering control linkage including
      a hydraulic actuator constituting a reverse steering logic mechanism, said hydraulic actuator being switched between a forward traveling state and a backward traveling state, wherein the relation of movement direction of said swash plate of said steering pump to movement direction of said steering operation device is reversed according to switching of said hydraulic actuator between said forward traveling state and said backward traveling state, and
      a hydraulic valve for supplying fluid to said hydraulic actuator, said hydraulic valve being controlled so as to set said hydraulic actuator to either said forward traveling state or backward traveling state depending upon whether said speed control operation device is operated for forward traveling or backward traveling.

2. The hydraulically driven and steered vehicle as set forth in claim 1, wherein said hydraulic actuator can be switched to a neutral state for setting said swash plate of said steering pump to its neutral position, and wherein said hydraulic valve can be controlled so as to set said hydraulic actuator to said neutral state by setting said speed control operation device in a neutral position.

3. The hydraulically driven and steered vehicle as set forth in claim 1, wherein said steering control linkage is provided with a mechanism for returning said steering operation device and said swash plate of said steering pump to respective neutral positions.

4. The hydraulically driven and steered vehicle as set forth in claim 1, said steering operation device being a steering wheel having a rotational axis with a bottom end pinion, said steering control linkage comprising:
   a sector gear meshing with said pinion, said sector gear having opposite first and second ends between a gear edge thereof and a pivot end thereof;
   a link member interposed between said sector gear and said swash plate of said steering pump, wherein said link member is connected to a first portion of said sector gear toward said first end by setting said hydraulic actuator to said forward traveling state, and wherein said link member is connected to a second portion of said sector gear toward said second end by setting said hydraulic actuator to said backward traveling state.

5. The hydraulically driven and steered vehicle as set forth in claim 4, wherein said hydraulic actuator can be switched to a neutral state for setting said swash plate of said steering pump to its neutral position, wherein said hydraulic valve can be controlled so as to set said hydraulic actuator to said neutral state by setting said speed control operation device in a neutral position, and wherein said link member is connected to a middle portion of said sector gear between said first and second ends by setting said hydraulic actuator to said neutral state.

6. The hydraulically driven and steered vehicle as set forth in claim 4, wherein said sector gear is extended toward said steering HST from said pinion.

7. A hydraulically driven and steered vehicle, comprising:
   a pair of axles differentially connected to each other;
   a prime mover;
   a speed control operation device for controlling the traveling speed of the vehicle and switching the traveling direction of the vehicle between forward and backward;
   a traveling HST including
      a variable displacement hydraulic traveling pump drivingly connected to said prime mover, said traveling pump having a movable swash plate operatively connected to said speed control operation device,
      a hydraulic traveling motor drivingly connected to said axles so as to drive said axles at the same various speed in the same forward or backward direction, and
      a closed fluid circuit fluidly connecting said traveling pump and said traveling motor;
   a steering operation device for turning the vehicle; and
   a steering HST including
      a variable displacement hydraulic steering pump drivingly connected to said prime mover, said steering pump having a movable swash plate operatively connected to said steering operation device,
      a hydraulic steering motor drivingly connected to said axles so as to drive said axles differentially,
      a closed fluid circuit fluidly connecting said steering pump and said steering motor,
      a directive control valve disposed in said closed fluid circuit of said steering HST so as to be switched by operation of said speed control operation device for reversing the traveling direction, and
      a flow control valve disposed in said closed fluid circuit of said steering HST so as to restrict the amount of fluid flowing therethrough when said directive control valve is switched.

8. A hydraulically driven and steered vehicle, comprising:
   a pair of axles differentially connected to each other;
   a prime mover;

a speed control operation device for controlling the traveling speed of the vehicle and switching the traveling direction of the vehicle between forward and backward;

a traveling HST including a variable displacement hydraulic traveling pump drivingly connected to said prime mover, said traveling pump having a movable swash plate operatively connected to said speed control operation device, a hydraulic traveling motor drivingly connected to said axles so as to drive said axles at the same various speed in the same forward or backward direction, and a closed fluid circuit fluidly connecting said traveling pump and said traveling motor;

a steering operation device for turning the vehicle; and a steering HST including a variable displacement hydraulic steering pump drivingly connected to said prime mover, said steering pump having a movable swash plate operatively connected to said steering operation device, a hydraulic steering motor drivingly connected to said axles so as to drive said axles differentially, a closed fluid circuit fluidly connecting said steering pump and said steering motor, a directive control valve disposed in said closed fluid circuit of said steering HST so as to be switched by operation of said speed control operation device for reversing the traveling direction, and a pressure control valve disposed in said closed fluid circuit of said steering HST so as to restrict the pressure of fluid flowing therethrough when said directive control valve is switched.

* * * * *